United States Patent [19]
Ma

[11] Patent Number: 5,180,559
[45] Date of Patent: Jan. 19, 1993

[54] EMISSION CONTROL

[75] Inventor: Thomas T. Ma, South Woodham Ferrers, Great Britain

[73] Assignee: Ford Motor Company, Dearborn, Mich.

[21] Appl. No.: 775,948

[22] PCT Filed: May 16, 1990

[86] PCT No.: PCT/GB90/00756
§ 371 Date: Oct. 21, 1991
§ 102(e) Date: Oct. 21, 1991

[87] PCT Pub. No.: WO90/14507
PCT Pub. Date: Nov. 29, 1990

[30] Foreign Application Priority Data
May 17, 1989 [GB] United Kingdom ............... 8911361

[51] Int. Cl.⁵ .......................................... F01N 3/20
[52] U.S. Cl. ...................... 422/168; 422/171; 422/174; 422/180; 422/186; 55/DIG. 30; 60/275; 60/300; 60/320; 423/212
[58] Field of Search ............. 422/168, 171, 173, 174, 422/177, 180, 186, 187; 55/DIG. 30; 60/275, 300, 320; 423/212

[56] References Cited
U.S. PATENT DOCUMENTS
4,945,721 8/1990 Cornwell et al. ............... 422/168

Primary Examiner—Lynn M. Kummert
Attorney, Agent, or Firm—Joseph W. Malleck; Roger L. May

[57] ABSTRACT

A method of reducing the light-off time of a catalytic converter comprising exposing the matrix of the converter to an alternating magnetic field or to electromagnetic radiation having a frequency such that the washcoat and the catalyst particles supported by the matrix are heated to the light-off temperature without a corresponding increase in the temperature of the entire matrix. The catalytic converter includes a matrix formed in two or more parts, of which the downstream parts are conventional. The upstream part of the matrix consists of a honeycomb made of a material which does not absorb microwave energy, is coated with a washcoat dispersed with catalyst particles which does heat up when exposed to microwave energy, and is enclosed in a waveguide having perforated walls through which exhaust gases can flow.

5 Claims, 1 Drawing Sheet

Figure
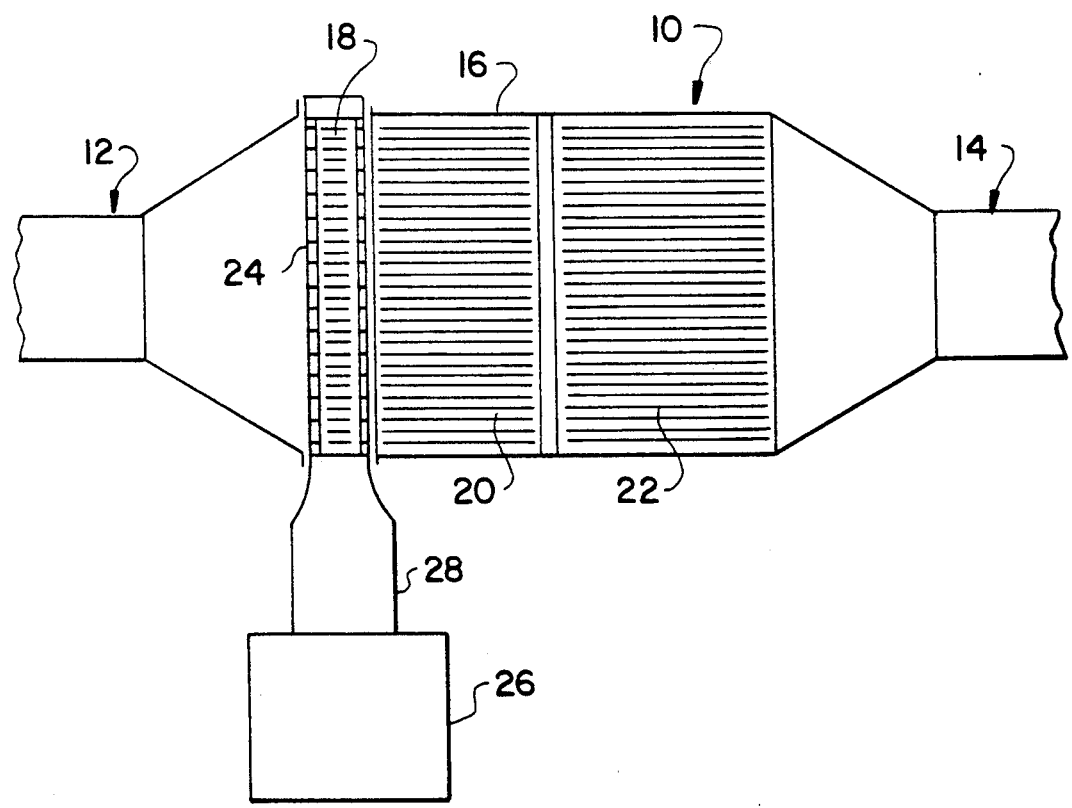

EMISSION CONTROL

The invention relates to reducing emission of toxic gases when cold starting, an engine and during engine warm-up.

DESCRIPTION OF THE PRIOR ART

In order to reduce unburnt hydrocarbons, carbon monoxide and oxides of nitrogen in exhaust gases, it is known to include in the exhaust system a catalytic converter. Such catalytic converters comprise a honeycomb matrix, usually ceramic, defining a large surface area over which the exhaust gases pass and a catalyst, often comprising fine particles of a noble metal such as platinum and sometimes a base metal such as cerium oxide, supported in a porous wash coat, for example of alumina, which is applied to the surface of the matrix.

Many countries now have laws governing permissible limits of gas emissions and these are measured over a standardised drive cycle which starts from a cold engine. In tests, it has been found that nearly a third of all the measured emissions during the drive cycle occur in the first hundred seconds from start. In part, this is caused by the fact that the toxic gas content of the exhaust gases on leaving the combustion chamber is higher when the engine is cold than after the engine has warmed up. The other reason is that the efficiency of the conversion depends upon the operating temperature of the catalyst and while the catalytic converter operates satisfactorily at normal engine running temperatures, during cold-start and warm-up, before the catalyst reaches a so-called light-off temperature, the converter is almost ineffective.

Both these causes of toxic gas emission during warm-up are known and proposals have been made in the past to reduce engine warm-up time and catalyst light-off time. The present invention addresses only the second of these two known problems. Hitherto, attempts to heat the catalyst have relied on heating elements designed to heat up both the matrix and the catalytic coating. Such proposals can be found in GB-1,349,426 and GB-1,492,737. However, the matrix has a large thermal capacity and poor thermal conductivity and the combined effect of these two properties is that heating of the converter in this manner is not very rapid nor effective. For this reason, many prior art proposals have required pre-heating of the catalytic converter but this is not a satisfactory solution because a driver cannot be expected to wait several minutes for the catalyst to reach its light off temperature before starting the engine.

SUMMARY OF THE INVENTION

The present invention, in its broadest aspect, provides a method of reducing the light off time of a catalytic converter which comprises exposing the matrix of the converter to an alternating magnetic field or to electromagnetic radiation having such a frequency that the wash coat and the particles of catalyst supported by the matrix are heated to the light-off temperature without a corresponding increase in the temperature of the entire matrix.

According to a second aspect of the invention, there is provided an exhaust system incorporating a catalytic converter and a microwave source or an induction heater connected to the converter for heating the converter before or during cold starting in order to reduce the light-off time of the catalyst.

BRIEF DESCRIPTION OF THE DRAWING

The FIGURE is a schematic elevational view of a catalytic converter assembly in accordance with this invention.

DETAILED DESCRIPTION AND BEST MODE

The use of microwave and R.F. energy as a source of heat has been proposed in other, but not analogous, applications. Outside the field of motor vehicles, it has been suggested in GB-663,914 to use microwave energy to speed up endothermic reactions, whether or not they involve the use of a catalyst. In this case, a purposely designed reaction chamber is used and energy is supplied continuously to enable the reaction to take place. The dielectric properties of the materials in the reaction chamber are selected to achieve the desired heating effect on exposure to radiation.

The present invention differs from this prior art proposal in all these respects. In particular, the redox reaction which takes place in the converter is exothermic and the catalytic converter only needs to be heated when the engine is first started. More importantly, one does not have the option to modify the dielectric properties of the catalytic converter at will, these being predetermined by the construction of the matrix, the wash coat and the catalyst. The problems in the two cases are essentially different in that in the prior art, it is the steady state heating effect that is achieved by heating the dielectric using an applied field whereas in the present invention, the aim is to reduce the time taken to reach the steady state and when this is reached the exothermic reaction maintains the temperature of the converter at its desired level.

Microwave energy has also been used in diesel engines to burn off the soot which collects in the particulate trap of the exhaust system. Rather than suggest a possible solution to the heating catalytic converters, this prior art warns of the risk of causing irreversible damage to the catalyst by the use of microwave energy. Hitherto, the dielectric properties of the wash coat were never appreciated. One could only expect that the platinum particles of a catalytic converter would be heated by the radiation and one would fear that, like the soot in particulate filter traps, the catalyst would be vaporised or possibly fused into ineffective globules. It should be noted in this context that the temperature reached by the particles of catalyst is dependent not only on the heating effect of the radiation but also on the cooling effect of the gases flowing over the matrix. This variable cooling effect and the minute thermal capacity of the particles of catalyst together would make it impossible to control the microwave energy in such a manner as to maintain the temperature of the catalyst constant. Even if the average power could be controlled, the uneven power distribution and the uneven cooling effect would result in some of the catalyst being damaged.

In a filter trap, this is not a problem because one cares only about burning off the soot and there is no serious disadvantage in applying excessive energy. In the present invention, however, if the catalyst were the only radiation absorbing material in the converter, then too little energy would not achieve the desired result of reducing light off time and too much energy would cause irreversible damage to the catalytic converter.

One sees therefore that the resemblance of the prior art to the present invention is only superficial. This is because the prior art does not recognise the crucial fact that the wash coat can absorb radiation energy and protect the catalyst from damage.

The dielectric properties of the wash coat are in fact important for several reasons. First, the thermal capacity of the material heated by the radiation is much greater than that of the catalyst alone, thus simplifying power control and reducing the risk of damage. Second, the heat transfer surface of the heated material is much larger, thereby enabling the exhaust gases to be heated which they could not be by heating the particles of catalyst alone. Lastly, the energy distribution is not confined to small very hot spots of catalyst but is evenly distributed over the entire surface of the matrix.

Heating of the wash coat may be effected either by electromagnetic radiation lying in the microwave region of the spectrum or by an alternating magnetic field as used in induction heaters.

As earlier mentioned, in the construction of catalytic converters, a honeycomb structure formed of a ceramic material is coated with a wash-coat in which the particles of catalyst are dispersed. The wash-coat, which is for example made of alumina, has high porosity and therefore increases the surface area of the matrix.

In experiments conducted using currently available engine exhaust catalytic converters, it has been confirmed, that the matrix itself is not heated by microwave energy making it possible to heat the active portion of the converter, i.e. the surface of the matrix, without heating the entire body of the matrix.

It has also been discovered, surprisingly, that the wash coats currently used for some converters already have appropriate dielectric properties and are heated by the microwave energy. It should be mentioned that were this not the case, it would be possible to dope the material of the wash coat with an appropriate impurity to achieve the desired dielectric properties.

Using a matrix having a wash coat and no particles of catalyst, it has been found possible to heat the surface of the matrix to the light off temperature in an acceptably short period of time. The presence of platinum particles does not greatly affect the surface temperature and the particles themselves have no tendency to overheat because of the heat dissipation into the wash coat.

With respect to the second aspect of this invention, it should be noted that because an unassisted catalytic converter will reach its light off temperature in a time of one to two minutes, to be effective, the invention should able to reduce this time to a few seconds. Therefore the power supply required by any form of supplementary heating will be large and it is important to reduce the power demand as much as possible in order to reduce the cost of implementation.

As compared with the prior art in which the entire matrix was pre-heated, the invention already reduces the power demand by concentrating the heat on the surface of the matrix where it is effective. A still further improvement can be achieved by heating only a section of the entire catalytic converter. Converters are sometimes constructed of two matrices arranged sequentially in the exhaust gas stream and it is only necessary in such a case to heat one of the two matrices. Alternatively, a specially constructed heated slice of matrix may be placed at one end, preferably the upstream end, of the converter.

It is possible to heat only one section of the matrix by sandwiching the section between two perforated sheets which form part of a waveguide but do not interfere with the flow of exhaust gases through the catalytic converter.

The invention will now be described further, by way of example, with reference to the accompanying drawing which is a section through a catalytic converter.

The drawing shows a catalytic converter 10 arranged between two sections 12 and 14 of an exhaust pipe 14 as near as possible to the engine block. The converter 10 has a casing 16 and matrix formed in three parts 18, 20 and 22 of which the parts 20 and 22 are conventional.

The part of the matrix 18 also consists of a honeycomb of a material which does not absorb microwave energy and coated with a wash coat which does heat up when exposed to microwave energy, the particles of catalyst being dispersed in the wash coat. The part 18 is enclosed in a waveguide 28 having perforated walls 24 through which the exhaust gases can flow. The waveguide need not necessarily be a resonant cavity so long as the energy is absorbed by the wash coat during the passage of a wave generated in a magnetron 26 through the waveguide 28.

During engine start-up, the magnetron 26 is energised and heats the wash coat only of the part 18 of the matrix disposed in the wave guide 28. This has the effect first of raising the fairly small amount of wash coat at the front end of the converter to the light off temperature and immediately reducing the toxic gas content of the exhaust gases. At the same time, heat is generated within this part of the matrix by the resultant exothermic reaction and this, together with the heating of the wash coat, raises the temperature of the exhaust gases to reduce the time taken for the rest of the matrix to reach the light off temperature.

The effect of splitting the matrix into heated and unheated sections is therefore to reduce the power required for a given improvement in the time taken for part of the converter to reach the light off temperature. The smaller the heated section, the less time it will take to reach light off but the less will be its conversion capacity and therefore its effectiveness in reducing the toxic gas content. The size will therefore be selected in practice as the best compromise between performance and power demand.

I claim:

1. A method of reducing the light-off time of a catalytic converter having a matrix provided with a washcoat containing catalystic particles, which method comprises (i) exposing the matrix of the converter to an alternating magnetic field or to electromagnetic radiation having such a frequency that the washcoat and the particles of catalyst supported by the matrix are heated, and (ii) continuing such heating of said washcoat and particles to the light-off temperature without a corresponding increase in the temperature of the entire matrix.

2. A method as claimed in claim 1, in which the matrix of the converter is formed in separate sections, only one section being heated by means of the alternating magnetic field or the electromagnetic radiation.

3. A method as claimed in claim 1, wherein the radiation applied to heat the wash coat lies within the microwave range of the spectrum.

4. A catalytic converter assembly, comprising a matrix formed of a material which does not absorb microwave radiation, the matrix being coated with a wash coat which is heated when exposed to microwave radiation and which has particles of a catalyst dispersed therein, means for connecting said connector by a waveguide to a source of microwave radiation, the waveguide being constructed to expose the wash coat of at least part of the matrix to the radiation emitted by the source without interfering with the flow of exhaust gases through the converter.

5. A catalytic converter assembly as claimed in claims 4, wherein for connecting the matrix is formed in two or more parts and said means provides for only one of the parts being heated by the microwave radiation.

* * * * *